Patented Oct. 14, 1941

2,258,709

UNITED STATES PATENT OFFICE 2,258,709

SULPHATED SELECTIVELY CALCINED DOLOMITE AND PROCESS FOR MAKING THE SAME

Walter H. MacIntire, Knoxville, Tenn., assignor to American Zinc, Lead & Smelting Company, St. Louis, Mo., a corporation of Maine No Drawing. Application February 4, 1939, Serial No. 254,705

9 Claims. (Cl. 71—63)

This invention relates to a process for sulphating and selectively calcining dolomite and the product secured thereby.

Recognition of the nutrient value of magnesic compounds has resulted in a demand for materials that can be introduced into fertilizers to supply magnesium in forms classified as "available." The only economic source of water-soluble magnesium compound, the form most quickly available, has been imported materials, such as manure salts and dehydrated magnesium sulphate from both natural and by-product forms. Oxide of magnesia derived from the calcination of magnesite is another form of high degree of availability, and also of neutralizing and conditioning value, but this has not come into extensive use because of its cost. The use of magnesium oxide in its mechanical association with calcium carbonate as concomitant components of selectively calcined dolomite is prescribed in my co-pending application, Serial No. 127,565, which stipulates that phosphatic fertilizers can be processed advantageously as to physical condition and magnesium content by admixtures of appropriate proportions of the selective calcine with acidic phosphates.

It is recognized that each of the two types of magnesic materials—the water-soluble and the readily available, but initially water-soluble oxide—has its characteristic properties that commend it as a component to be incorporated with fertilizers. The water-soluble sulphate of magnesium is available immediately to growing plants, but it is also leached readily after incorporation with soils, particularly the sandy types of soil of the Coastal Plains regions of high rainfall, and a distinct need of nutrient magnesium is encountered in those sections. Although practically insoluble in distilled water, the oxide form of magnesium becomes converted into solutes in the soil water and is then absorbed by the soil complexes in forms that afford a sustained source of nutrient magnesium to growing plants and nevertheless minimize losses of the element through leaching.

An ideal supplement of nutrient magnesium for inclusion in fertilizers would be one to supply the element partly in its water-soluble form and partly in a basic form to effect neutralization of excessive acidity or potential acidity. Such a combination would assure immediate nutrient requirements and provide a sustained supply for future plant growth. The combined advantages of the two magnesic materials, sulphate and oxide, of divergent chemical properties, might be met in some degree by a precombination of the two materials and a simultaneous incorporation of such a combination as a fertilizer supplement. Such a mixture would be devoid of soluble calcium salts that would be desirable and even essential in some instances. Such a mixture would also be devoid of the neutralizing capacity of the component calcium carbonate.

The object of the present invention is to utilize cheap by-product materials to produce a 4-component fertilizer supplement material that serves to improve the physical condition of immediate and potential acidity and also provide enrichment of nutrient content.

The product of the invention brings enrichment of calcium in the two forms, the appreciably soluble sulphate, and the water-insoluble basic carbonate in a finely divided and readily reactive form comparable to precipitated calcium carbonate and to high-calcic marl. The calcium sulphate content of the product is in the anhydrous form and therefore capable of a drying effect through hydration by the moisture of the fertilizer, whereas gypsum, or any similar form, is devoid of such capacity to effect hydration. Upon its quick reaction with the acidic phosphates of fertilizers, the calcium carbonate likewise serves as a drying agency through formation of di-calcium phosphates which convert moisture to water of constitution.

The product of the invention also brings enrichment of magnesium in two forms—the readily available sulphate anhydride ($MgSO_4$) and the anhydrous oxide ($MgO$). Both of these forms of magnesium have the direct capacity to transform moisture to water of chemical combination. The oxide form has the additional capacity to dessicate a phosphatic product as a consequence of the formation and hydration of engendered dimagnesium phosphate.

Another advantage of the product of the invention is the compatible relationships of the four major components and their mutual protective effect against chemical changes and physical results that would come in variant degree to three of the four components under storage as separates. Still another advantage is the accomplishments of the several conversions and transitions induced by the added sulphuric acid and by heat in a single inexpensive operation that utilizes a by-product dolomite to supply the calcium and magnesium of the final product.

Essentially, the invention involves a continuous operation of converting one-half of a given quantity of dolomite into its equivalent anhydride sulphates of calcium and magnesium and the breakdown of the other half of the dolomite into an intimate association of chemically active forms of calcium carbonate and magnesium oxide, the final product being a relatively soft 4-component system, the physical structure of which resembles the selective calcine derived from dolomite alone. The conversion of one-half of the dolomite into the two anhydride sulphates and the other half of the dolomite into a selective calcine of calcium carbonate and magnesium oxide is accomplished by a simultaneous calcination of the 4-component system. The temperature and other conditions imposed are those of my co-pending application Serial No. 127,565 for the conversion of comminuted dolomite into a selective calcine of calcium carbonate and magnesium oxide with a minimal incidence of free lime. Preferably, the continuously produced mixture of sulphated dolomite and raw dolomite is passed by agitating conveyors through a preheating zone and into the zone of calcination at a temperature substantially 600° C. in an atmosphere of steam. Because of the dilution of the raw dolomite by the included engendered sulphates of calcium and magnesium and because the divergent nature of the three components of the mixture afford a distended mass, the included dolomite calcines even more expeditiously than does the undiluted raw dolomite. The speed of the passage of the sulphated dolomite-raw dolomite mixture through the calcination chamber is regulated by the requirement for complete conversion of the magnesium carbonate of the dolomite into its component magnesium oxide, consequential to the release of its combined carbon dioxide. In practice, it is found that a calcination period of approximately 30 minutes is adequate and preferable. Under such conditions the added sulphuric acid is entirely recovered as the equivalent sulphates of calcium and magnesium, devoid of water of hydration, and the weight of the final product is from 7% to 10% in excess of the starting weight of dolomite.

Under ordinary calcination, or dehydration by applied heat, the several hydrated sulphates of calcium ($CaSO_4.2H_2O$; $CaSO_4.H_2O$; $2CaSO_4.H_2O$), and the several hydrated sulphates of magnesium ($MgSO_4.7H_2O$; $MgSO_4.6H_2O$; $MgSO_4.2H_2O$; $MgSO_4.H_2O$)

are transformed into the respective anhydrides, calcium sulphate ($CaSO_4$) and magnesium sulphate ($MgSO_4$), without further breakdown when the imposed temperature of 600° C. is imposed, though with unduly prolonged calcination at that temperature in an atmosphere of steam, there may occur some dissociation of the magnesium sulfate into a less soluble and more basic oxide form, with loss of sulphuric anhydride ($SO_3$). The conditions prescribed as requisite for the complete decomposition of the raw dolomite content of the partially sulphated mixture into an equivalence of selectively calcined dolomite do not effectuate this possible disruption of the equal-part balance between soluble magnesium sulphate and the basic or oxide form that is derived from the dolomite per se.

The optimal and preferred proportion of equal, or chemically equivalent, proportions of water-soluble calcium sulphate and calcium carbonate, and the two corresponding forms of magnesium in the finished product from a dolomite is the one prescribed as the preferred proportions in the finished product. However, the final products of similar physical properties can be obtained by a variation in the proportions of sulphated dolomite and undecomposed dolomite in the mixture subjected to the calcination temperature. The same is likewise true when a dolomitic limestone, rather than a "near" or "true" dolomite is used as the starting material. Such variation would, however, not involve a departure from the principle of my invention and I therefore do not confine myself strictly to the 1-1 proportions stipulated in the following example as being the one preferred for the quantities of sulphated dolomite and raw dolomite in the mixture that is subjected to the step of selective calcination. Moreover, to meet specific proportions and objectives, the preferred proportions may be deviated from in such degree as may be desired to meet the particular requirement and without departure from the fundamental principle of the invention.

*Example.*—The following results were obtained in the practice of the prescribed operation of the neutralization of one-half of a dolomite charge by added sulphuric acid and calcination of the resultant mass, when using a comminuted dolomite having a neutralizing value expressed as 98.16 per cent calcium carbonate equivalence, attributable to an actual calcium carbonate content of 52.5 per cent and 38.5 per cent of magnesium carbonate, with an impurity content of 9 per cent. It will be understood, however, that the invention is not limited to the use of dolomite of this grade, since other grades of dolomitic material may be used without departing from the principle of the invention, i. e., sulphating approximately one-half of the calcic and magnesic content of a dolomitic material and then calcining the mixture at approximately 600° C. in an atmosphere of steam.

To 200 parts of comminuted raw dolomite was added 96 parts of sulphuric acid ($H_2SO_4$) supplied by an equivalent quantity of 60° Bé., or 77 per cent concentration, with appropriate dilution with water to give a readily mixable mass and speedy decomposition of approximately one-half, or 100 parts of the total charge of 200 parts of raw dolomite. The resultant intimate mixture of raw dolomite and hydrated calcium sulphate and hydrated magnesium sulphate was then subjected under continuous agitation to calcination at a temperature of approximately 600° C., in an atmosphere of steam. There was thus effected a selective calcination of the 100 parts of raw dolomite into calcium carbonate and magnesium oxide, with concomitant dehydration of the calcium and magnesium sulphates that had been engendered through the reaction between the acid and 100 parts, or one-half, of the total dolomite charge.

Subsequent to the admixing of the acid with the dolomite, the mass comprising the undecomposed half of the dolomite and the engendered hydrated sulphates of calcium and magnesium was brought gradually to the temperature of approximately 600° C. essential for the conversion of the raw dolomite content of the mixture into calcium carbonate and magnesium oxide, as prescribed in my co-pending application, Serial No. 127,565, for the selective calcination of raw dolomite. When the above operation was carried out by subjecting the mixture to agitation and calcination in an atmosphere of steam, the resultant product amounted to a weight of 215 pounds for each 200 starting pounds of raw dolomite. The computed total calcium oxide-equivalent content of the product was 27.34 per cent, accounted for by 33.2 per cent of calcium sulphate (CaSO$_4$) and 24.4 per cent of calcium carbonate (CaCO$_3$). The computed total MgO content was 17.0 per cent, accounted for by 8.5 per cent each of magnesium sulphate (MgSO$_4$) and magnesium oxide (MgO). Actual analysis of the product showed a total calcium oxide-equivalent of 27.9 per cent and a total magnesium oxide-equivalent content of 17.56 per cent, substantially one-half (8.11 per cent) of the magnesia content being in a form readily extracted by cold water.

It is to be understood that the foregoing results were obtained by the use of a by-product raw dolomite of a degree of purity or concentration less than that to be had by the use of either a dolomite of greater purity or the same raw dolomite after mechanical removal of the quartz impurity. In either case, the concentration of the resultant sulphated selective calcine of sulphate-carbonate-oxide content will be greater than that shown for the product obtained from the by-product dolomite used in the example. With the maintenance of the same proportion of neutralizing carbonates of any dolomite and added acid (2 of CaO$_3$ and 1 of H$_2$SO$_4$) the resultant productt would be the same as the one of the example, except for the consequential higher degree of concentration of calcium and magnesium in the analagous product from the dolomite of greater purity.

It is to be understood that the product is not merely a mechanical mixture of the four (4) major components—calcium carbonate (CaCO$_3$), calcium sulphate (CaSO$_4$), magnesium sulphate (MgSO$_4$) and magnesium oxide (MgO). The intimacy of the first step of neutralizing one half of the raw dolomite charge by added sulphuric acid and the subsequent chemical transitions, sulphate dehydration and conversion of MgCO$_3$ to MgO during calcination, result in a product possessive of an intimacy of mechanical association not to be obtained solely by the mixing of the same separate materials. Moreover, the substantial proportions of the calcium carbonate and the oxide of magnesium serve to assure that the two anhydrides—the sulphates of calcium and magnesium—will continue in an optimal physical state. This inherent advantage is due to the heterogeneous nature of the mixture and the divergent properties of its several engendered components and hence a product that does not undergo undersirable set-up or hardening upon exposure to ordinary atmosphere and humidity.

What is claimed is:

1. The process which consists in intimately mixing raw comminuted dolomite with sulphuric acid in proportions of approximately two parts by weight of dolomite to one part of (H$_2$SO$_4$) sulphuric acid and raising the temperature of the mixture under agitation to approximately 600° C. in an atmosphere of steam.

2. The process which consists in mixing a quantity of comminuted dolomite with a sufficient amount of sulphuric acid to sulphate approximately one half of the dolomite, and then subjecting the resultant mixture to a temperature of approximately 600° C., in an atmosphere of steam under continuous agitation and until the unsulphated half of the dolomite is transformed into calcium carbonate and magnesium oxide.

3. The process which consists in mixing a quantity of comminuted dolomite with sufficient sulphuric acid to sulphate only a substantial portion thereof into sulphates of calcium and magnesium, thereby leaving a substantial portion of the dolomite that is not sulphated, the said acid being diluted to secure intimate mixing, then subjecting the resulting mixture of dolomite and sulphates to a temperature of approximately 600° C. in an atmosphere of steam while agitating the mixture, and maintaining the agitated mixture at a temperature of approximately 600° C. until the sulphated portion of the dolomite is converted into anhydrous sulphates of calcium and magnesium and the non-sulphated portion is converted into calcium carbonate and magnesium oxide.

4. The process which consists in intimately mixing a mass of comminuted dolomite with sufficient sulphuric acid and water to convert approximately half of the dolomite into sulphates of calcium and magnesium and leaving a substantial portion of the dolomite that is not sulphated, agitating the resultant mixture of sulphates and dolomite while bringing the mixture to a temperature of approximately 600° C. and maintaining agitation at approximately the same temperature in an atmosphere of steam until the non-sulphated dolomite in the mixture is converted into calcium carbonate and magnesium oxide and the sulphates of calcium and magnesium are rendered anhydrous.

5. As a new product, substantially chemically equivalent quantities of appreciably soluble sulphate of calcium, CaSO$_4$, and water insoluble basic carbonate of calcium, CaCO$_3$, intimately mixed with substantially chemically equivalent quantities of anhydrous sulphate of magnesium, MgSO$_4$, and oxide of magnesium, MgO.

6. The process which consists in forming a mixture of comminuted dolomite with hydrated sulphates of calcium and magnesium and subjecting the mixture to a temperature of 600° C., in an atmosphere of steam.

7. The process of simultaneously dehydrating calcium and magnesium suphates and selectively calcining comminuted dolomite, which consists in forming an intimate mixture of the comminuted dolomite with the calcium and magnesium sulphates and subjecting the mixture under agitation to a temperature of 600° C. in an atmosphere of steam.

8. The process which consists in forming a mixture of comminuted raw dolomite and sulphated dolomite and subjecting the mixture to a temperature of approximately 600° C., in an atmosphere of steam.

9. The process which consists in forming a mixture of raw dolomite, hydrated calcium sulphate and hydrated magnesium sulphate, and calcining the mixture at a temperature of approximately 600° C., in an atmosphere of steam.

WALTER H. MacINTIRE.